(12) United States Patent
Armer et al.

(10) Patent No.: US 7,216,504 B2
(45) Date of Patent: May 15, 2007

(54) TEMPERATURE CONTROLLED FOOD CONTAINER AND PROCESS

(75) Inventors: Mark A. Armer, West Hills, CA (US); Fred Gates, El Camino Village, CA (US); Jeff Nicholson, Long Beach, CA (US); James A. Ingram, Laguna Hills, CA (US)

(73) Assignee: Cambro Manufacturing Co., Huntington Beach, CA (US)

( * ) Notice: Subject to any disclaimer, the term of this patent is extended or adjusted under 35 U.S.C. 154(b) by 497 days.

(21) Appl. No.: 10/813,894

(22) Filed: Mar. 31, 2004

(65) Prior Publication Data

US 2005/0217311 A1 Oct. 6, 2005

(51) Int. Cl.
*F25D 3/08* (2006.01)

(52) U.S. Cl. ........................................ 62/457.2; 62/530

(58) Field of Classification Search .................. 62/371, 62/457.1, 457.2, 530
See application file for complete search history.

(56) References Cited

U.S. PATENT DOCUMENTS

| | | | |
|---|---|---|---|
| 4,981,234 A | 1/1991 | Slaughter | |
| 5,568,735 A | 10/1996 | Newkirk | |
| 5,885,636 A | * 3/1999 | Carville | 426/109 |
| 6,318,114 B1 | * 11/2001 | Slaughter | 62/457.2 |
| 2002/0020709 A1 | * 2/2002 | Huang et al. | 220/675 |

* cited by examiner

*Primary Examiner*—Melvin Jones
(74) *Attorney, Agent, or Firm*—George F. Bethel

(57) ABSTRACT

A temperature controlled food service container is formed with an inner portion having side walls and an opening for the receipt of food, and an outer portion having sidewalls spaced from the inner portion with a eutectic gel, disposed between them. A ledge extends from the periphery of the outer portion with a flange extending from the inner portion seated against the ledge; and is held by an ultrasonic bond joining the ledge to the flange. The food container has ribs along the sidewalls of the inner and outer portions. Peripheral channels and ridges are formed respectively on the ledge and flange for welded engagement with each other, the channels having enlarged segments which extend beyond the cross-sectional dimension of a respective ridge received therein. The method for making the food service container includes molding an outer walled shell portion having a ledge with at least one peripheral channel, and molding an inner walled shall portion having a major peripheral flange with at least one peripheral protuberance. Thereafter a eutectic gel is placed into the outer walled shell portion and the inner walled shell portion is placed therein. The peripheral protuberance is indexed into the peripheral channel and the ledge and flange are ultrasonically bonded.

12 Claims, 7 Drawing Sheets

TEMPERATURE CONTROLLED FOOD CONTAINER AND PROCESS

BACKGROUND OF THE INVENTION

1. Field of the Invention

The field of this invention lies within the food pan and container art particularly as it relates to maintaining food at a desired temperature to limit spoilage, and enhance tastiness. More particularly, it lies within the art of maintaining food in a safe and improved temperature environment in a food pan or container. The food pan is surrounded by a medium such as a eutectic gel which can be a highly absorbent polymer. The eutectic gel is exposed to a relative temperature in order to bring the temperature of the eutectic gel to a desired level. Thus, when the food is placed within the pan having the eutectic gel exposed to a previous temperature, it helps to sustain the temperature of the food at a desirable level.

Such temperature controlled containers and pans utilizing eutectic gels are often used in commercial food service establishments. The food pans and containers with the eutectic gels can be utilized within the field of institutional food service such as restaurants, fast food restaurants, hospitals, schools, banquet facilities, and other related commercial and institutional food service activities. The end result is to provide for a desirable food service as to quality, temperature control, tastiness as well as attractive appearances of the food.

2. Prior Art

The prior art with respect to temperature controlled containers includes which have substances such as ice in various forms including dry ice and ice made from water. Utilization of such containers often times is cumbersome and difficult and, of course, requires large volumes of ice.

Of late, it has been established that containers having a eutectic gel surrounding them or in association therewith such as those items known as ice and heat packs that can be pre-chilled or frozen, can provide substantially superior maintenance of foods in a container. Also, such eutectic gels packs can be used for maintaining heat as well as cooling purposes.

When using eutectic gels, they should not be exposed to the food, which they are designed to maintain in a temperature-enhanced environment. As a consequence, any leakage of material from a package containing the eutectic gel or a container containing the eutectic gel into the food can be a drawback. In order to eliminate such exposure of food to the eutectic gel, it has been common to provide for an inner and outer shell with a eutectic gel there between.

The inner shell is utilized to hold the food and is in contact with the food. The outer shell surrounds the inner shell. In between the inner and outer shell, the eutectic gel is placed so that it can be cooled to a particular extent or maintained in any other suitable temperature or heat controlled environment.

In the past, the utilization of a lip or flange to interface between the inner and outer shells effectuated a sealing contact surface to maintain the eutectic gel between the inner and outer shells. This was effected by various means including adhesives that bonded the two respective inner and outer shells together.

The utilization of an adhesive or gluing agent was found to be difficult in application and sometimes did not provide for a sufficiently strong and complete seal. This, of course, led to the disassociation of the inner and outer shell and in some cases, a leakage of the eutectic gel into the inner position of the container containing the food.

This invention particularly enhances the securement of the inner and outer shell by means of an ultrasonic welding process. To this extent, the ultrasonic welding process utilizes an inner and outer shell which are bonded at a weld surface with an inner and outer respective flange, lip or ledge being secured together.

The inner and outer flanges, lips or ledges respectively have welding flanges, ribs, bands, strips, ridges, rims or protuberances, which can be indexed into welding grooves or channels. The welding channels or grooves receive the protuberances or ridges in an indexed and matched manner substantially around the surface of the main outer flange and inner flange lips or ledges, which extend beyond the periphery of the container.

When the welding ridges or strips are seated and driven against the surfaces of the channels, they effect an ultrasonic weld that is properly indexed as well as such where it drives against a surface for plastic flow of the materials.

An enhancement of this invention is the utilization of expanded portions in the welding channels with expansion gaps. These expanded portions or expansion gaps permit the weld to take place without undue displacement by either the heated materials or gases created during the welding process. The gaps, which can be in the form of offsets, depressions, or other expansion areas, allow for the expansion of gas or materials to provide, an effective weld taking place without being dislocated or driving the weldment into a displaced relationship.

It has been found with the expansion gaps or depressions, that a stronger weld takes place and a significant elimination of failures of the weld have been eliminated.

A further enhancement of this invention is the utilization of spacers or ribs between the inner shell and outer shell. The spacers or ribs allow for indexing of the inner and outer shell together for proper placement of the eutectic gel as well as orientation during the welding process. Further to this extent, they also enhance and rigidify the overall wall structure of the inner and outer shell to provide for a strengthened composite food container.

Another feature and objective of this invention is to allow for the stacking of the units both before and after welding of the inner and outer portions. The stacking of the units can be accomplished so that multiple inner or outer shells can be stacked together prior to the welding process. This allows for continuity of the process without the necessity of handling each inner or outer shell on a singular basis so that they can be handled fundamentally on a series basis.

Another feature of this invention is a ledge or step within the base portion of the completed product formed in the outer shell. This allows for the completed products to be stacked together both when in use and not in use. Thus, multiple units can be handled and placed within a preconditioning temperature environment in order to create a series of them that can then be nested and separated at a later point.

The improved process relies upon the proper measurement of eutectic gel and any displacement thereof by the inner shell when joined together with the outer shell having the eutectic gel therein. The displacement is accomplished through a certain level to allow for expansion and contraction of the eutectic gel during the various temperatures at which it is used.

As a consequence, this invention is a significant step as to both the end product and the process in manufacturing the product.

SUMMARY OF THE INVENTION

In summation, this invention comprises a food pan or container which can enhance and maintain food at a desirable temperature by a eutectic gel which is placed between an inner and outer shell which is secured by ultrasonic welding of the two respective shells together. The process for welding the inner and outer shells together is enhanced by respective welding rims, ridges, flanges and grooves or channels having an improved configuration and appropriate indexing orientations.

More particularly, the invention comprises an improved temperature controlled container or pan for food service in a commercial or institutional environment. The food container is provided with a eutectic gel and a configuration which maintains the food at a desirable temperature once the gel has been chilled, frozen or brought to a temperature that is desired.

The container is formed by an inner shell and an outer shell. The inner shell has a peripheral rim or flange with a depending lip margin or border protuberance around the rim or flange.

The outer shell has a complementary peripheral rim or flange in which a series of peripheral channels or grooves are provided which index into ribs as ridges on the flange of the inner container.

When the two respective flanges of the inner and outer container are brought together and welded, the matching configuration of the respective complementary flanges, with their ridges and channels create an indexing and an improved weldment.

In order to enhance the welding process, the channels are provided with expansion gaps or indentations. These respective expansion gaps, offsets or indentations create a situation wherein the gas or heated material can expand into the gaps and prevent a dislodgment or displacement of the respective parts through the welding process. The expansion gaps effectively allow for the gas or material to expand therein to thereby enhance the overall welding process.

A further improvement of this invention is the fact that the inner and outer shell are indexed to each other by ribs which help to align and maintain the process. The maintenance of the ribs and indexing of the inner and outer shell together create a situation which improves the orientation and strengthens the inner and outer shells in their respective relationship for improved strength, stability and improved manufacture and processing.

The overall process diminishes disorientation and serves to diminish the weakness created during a welding process by displacement of unwanted gas or material. Additionally, the invention orients the eutectic gel and the inner and outer shell together for enhanced and improved maintenance of food therein.

A further enhancedment is the ability of the inner and outer shells to be serially stacked together before the welding process. After the shells have been welded together, further enhancement is provided by a step or ledge in the base of each outer shell, which allows for nesting and stacking of the containers for proper orientation and storage.

DETAILED DESCRIPTION OF THE PREFERRED EMBODIMENTS

Figure 1:
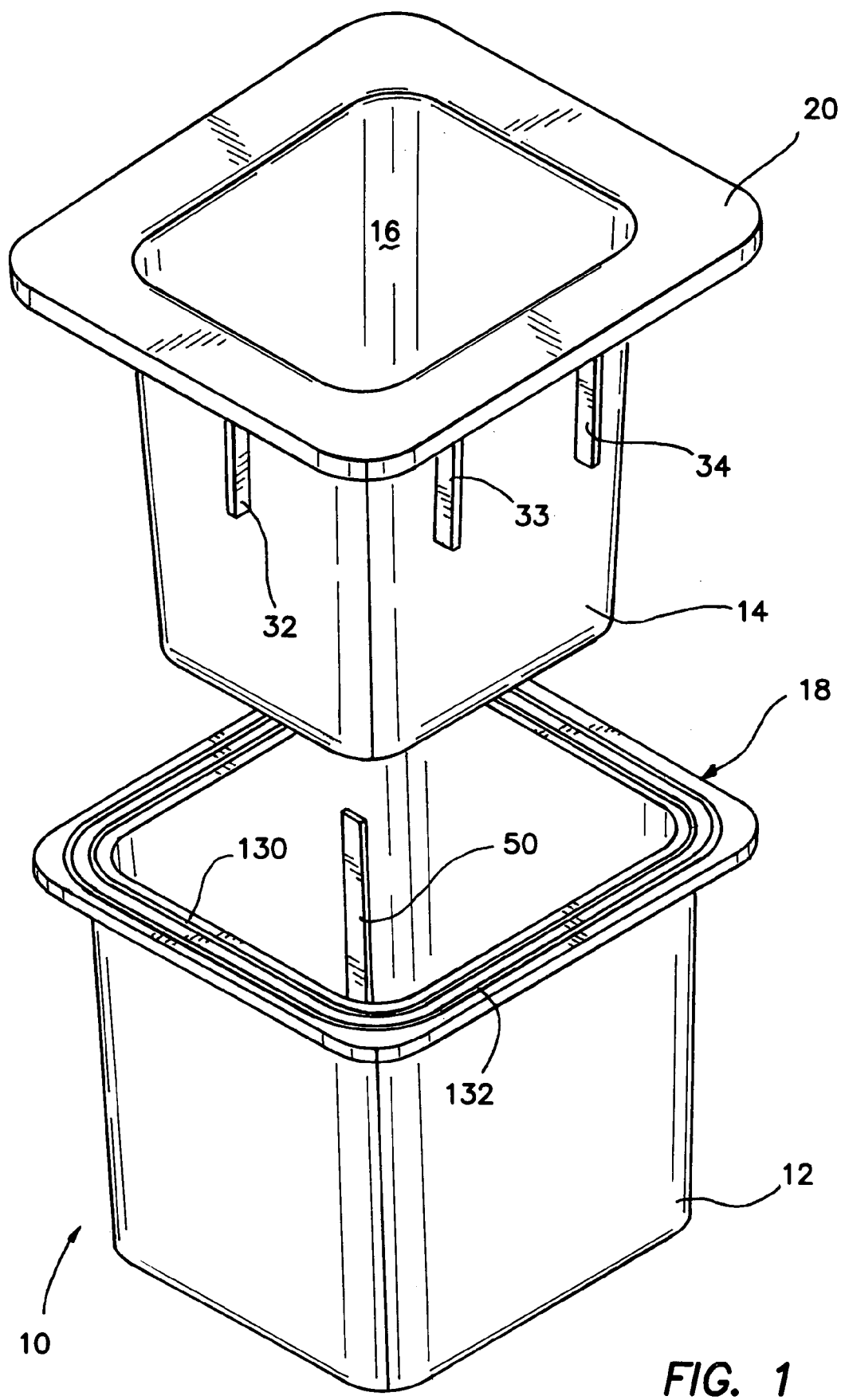
FIG. 1 shows an exploded perspective view of the inner and outer shells of this invention.

FIG. 1 shows the temperature-controlled food container of this invention in the form of container 10. Looking at the container 10, it can be seen that it comprises an outer portion, shell, casing, or residual holder 12. Seated within the outer portion or shell 12 is an inner portion or shell 14. The inner portion or shell 14 seats within the outer portion or shell 12 in a relatively fixed and indexed relationship.

Within the interior portion or shell 14 is a void, space, or food receptacle 16. The food receptacle 16 receives the food that is to be maintained in the temperature-controlled manner.

Both of the inner and outer shells 14 and 12 are made of plastic and respectively have an extending major lip flange, rim or ledge. In particular, the outer shell 12 has a lip, flange or ledge 18. This lip flange or ledge 18 allows for placement of the inner shell thereon and a proper complementary connection as will be detailed hereinafter.

The inner shell 14 has an overlying lip flange or ledge 20 which can be seen in the figures overlying the lip, flange or ledge 18 of the outer shell.

The two respective lips or flanges 18 and 20 are sealed together by an ultrasonic welding process. The ultrasonic welding process welds the plastic material together so that it forms a bond for receipt of a material such as a eutectic gel 22 that is placed within the walls between the inner shell 14 and outer shell 12.

The walls of the inner shell 14 and the outer shell 12 can be configured in any particular manner of plastic. Thus, they can be configured so as to be of a cylindrical form for receipt of food within a void 16 inside of a cylinder. Other configurations can be such where they have a square cross-section, elongated rectangular cross-section, rectangular configuration in the form of a cross-section, or a rhomboid or diamond cross-section as well as other configurations such as an elliptical cross-section depending upon the particular desired end use.

The inner shell 14 has a plurality of ribs around the periphery thereof. These particular ribs are shown as ribs 26, 28, 30, 32, 33 and 34. Each of the ribs 26 through 34 has an orientation depending downwardly along the longitudinal dimensions of the inner shell 14. In this manner, the ribs can be used to provide stiffening and rigidity to the inner shell 14. Further to this extent, the ribs also provide an indexing of the inner shell to the outer shell 12 when the respective parts are placed together for purposes of joindure and welding. This joindure and welding process is such wherein the ribs when indexed into the inner walls of the outer shell 12 can then be joined in a more facile manner.

Each of the ribs 26 through 34 have a stepped portion 40 formed as a rounded step like surface. The rounded step like surface is such wherein it allows the stacking of the inner shells 14 in a facile manner prior to there being welded to the outer shells 12. Thus, a stack of inner shells 14 can be laid up into a significant stack or pile thereof without binding on the interior surfaces to the extent where they are hard to remove from each other. Thus, the nesting of the inner shells 14 during the stacking process is such wherein they can be easily divided or separated without any extent or of binding frictional engagement, in as much as the surfaces of the steps 40 are rounded and seat on the edges of the lip or ledge 20 of the inner shells 14.

The seating of the step 40 when the inner shells 14 are stacked or nested is against the rounded edge surfaces or corners 44 surrounding the interior. In this manner, the edge of the ribs 26 through 34 ride against the surrounding interior peripheral surface 44 of the inner shell 14. This allows for facile and easily removed displacement of the inner shells 14 when stacked together prior to being separated for welding to the respective outer shell 12 to which it is later connected.

In order to have an indexing of the outer shell 12 to the inner shell 14, a second series of ribs are provided. These ribs comprise longitudinally extending ribs 50, 52, 54 and 56. The ribs 50 through 56 are such wherein they provide for the nesting of the inner shell 14 to the outer shell 12 in a spaced manner. This enhances the overall nesting and placement of the shells 12 and 14 both prior to welding, and after the welding process for rigidification of the walls of the outer shell 12 and the entire product once it has been implaced and welded.

Figure 8:
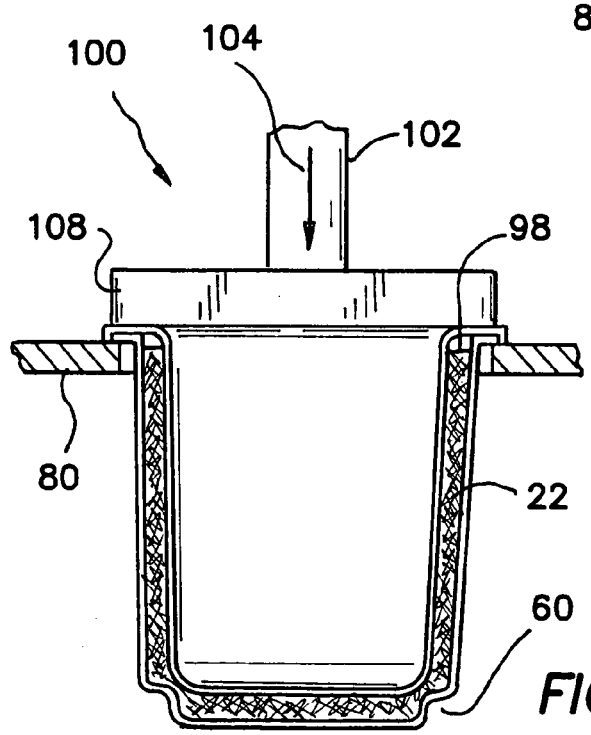
FIG. 8 shows a fragmented sectional view of the welding process whereby ultrasonic energy is applied to the inner and outer shells through a welding horn.

Once the entire product has been welded as shown in FIG. 8, the product can then be stacked in its completed form and nested by means of a step, ledge, or peripheral inset 60. This peripheral inset or step 60 allows for a stacking of the respective outer shells 12 in both the incomplete and separate relationship prior to welding. This enables a stacking of the containers 10 with food in the voids 16 as well as without the food in the voids 16. This also provides for easier handling and overall facile movement of a plurality of containers 10.

Between the walls of the outer shell 12 and inner shell 14, is a eutectic gel. This gel can be of a polymeric substance as well as being formed of either an organic or an inorganic substance. In this particular case, the gel is of an organic material and can be placed into a surrounding cold area in order to lower the temperature of the gel. Various gels can be utilized having various chemical compositions. The one criteria is that the gel should be able to undertake a significant drop in temperature and retain it to a greater degree than other materials. Such gels are known in the art for providing a cold retention or hot retention property. The gel can be reused or refrozen multiple times.

The gel in this case is an organic material formed of cellulose such as carboxy methyl cellulose and water. The range of it can be in the amount of eighty to ninety-nine percent (80%-99%) water and one to nineteen (1%-19%) cellulose ether. A preferred mixture is 97.2% water and 2.4% cellulose ether.

As a general consideration, the container 10 is placed with the opening to the void 16 in a downward orientation. It is placed in a freezer or a low temperature environment that can be such where the temperature is lowered. Generally, the container 10 is placed in a freezer with a temperature of 0 degrees Fahrenheit to 20 degrees Fahrenheit for an extended period of time which could be as long as 8 hours. The container is then removed and food products placed therein. The container 10 can then retain the food temperatures for an extended period of time when used in a normal, ambient condition.

Container 10 comprises the outer shell 12 and inner container or shell 14 which is formed by initially molding the respective portions 12 and 14 from a high impact plastic. This can be a high impact ABS plastic. However, it can be molded from any particular suitably strong plastic in various molding processes including compression molding, injection molding, rotational molding, and other suitable types of molding processes.

The net result for the two respective container shells or portions 12 and 14 should be such wherein after they have been joined together, they are properly held so that they can form a unitary food container which will serve to maintain temperature within the container 10.

In order to join the two respective container shells or portions 12 and 14 together, a sonic welding process is utilized. The joindure takes place by reason of a sonic welding head or horn shown in FIG. 8 proceeding downwardly and welding the outer major flange 20 of the inner shell 14 to the outer major flange or ledge 18 of the outer shell 12.

Figure 6:
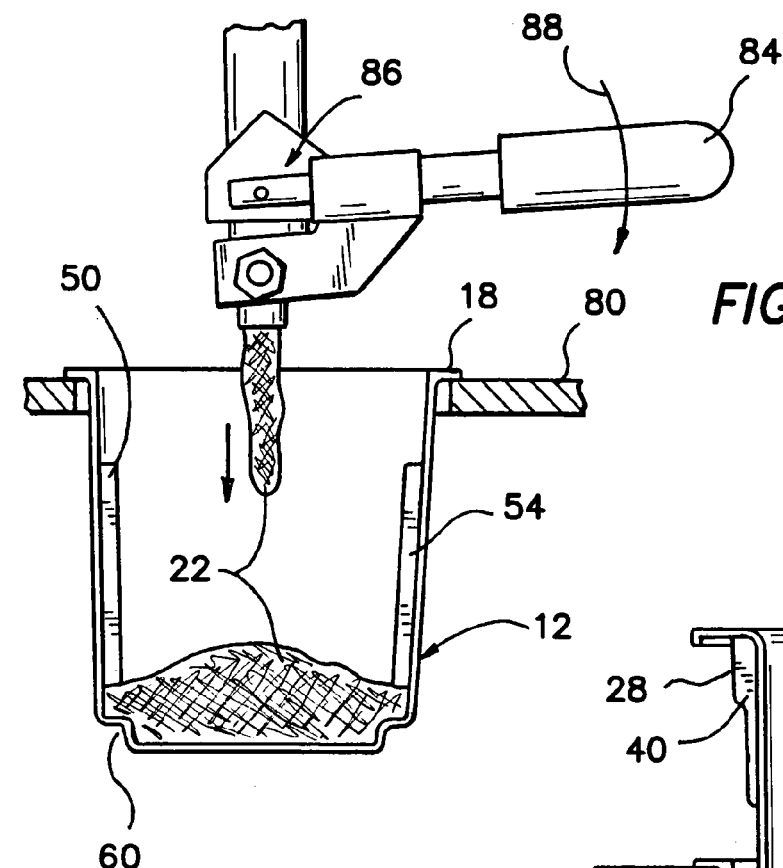
FIG. 6 is a fragmented sectional view showing the implacement of the eutectic gel within the outer container prior to weldment.
Figure 7:
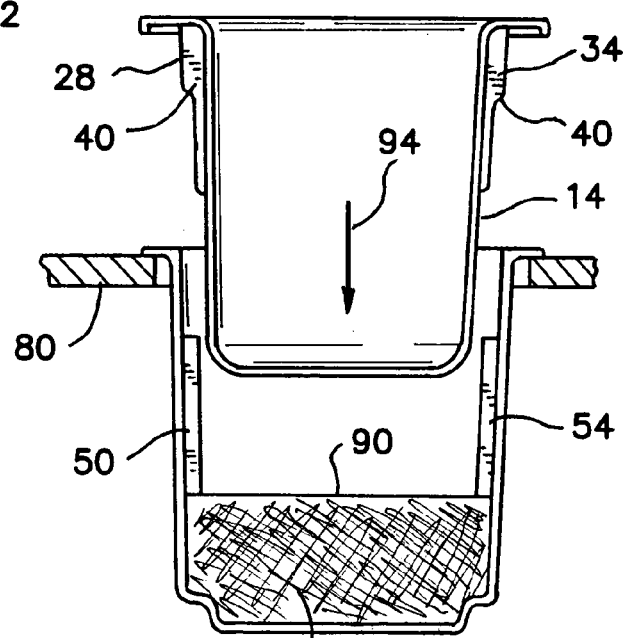
FIG. 7 is a fragmented sectional view showing the inner shell being implaced into the outer shell after the eutectic gel has been implaced therein.

Initially, an operation shown in FIGS. 6 and 7 is utilized. This encompasses the disposition of a eutectic gel that can be an organic or inorganic gel into the outer shell 12. The outer shell 12 is held on its flange, ledge or major lip 18 by a jig, peripheral support or other means to support the outer shell 12 in a fixed manner. This can be seen in the form of jig, fixture or securement peripheral holder 80 shown in FIGS. 6, 7 and 8.

With the outer shell 12 in place, eutectic gel 22 is disposed within the shell 12 by means of a flow from a supply that is controlled by a handle 84 operating a valve mechanism 86 to provide for the flow into the outer container 12. The handle 84 is shown moving in the direction of arrow 88 by a manual articulation. However, any suitable valving process can be utilized for purposes of allowing the flow 22, of the eutectic gel into the outer container. For instance, a transducer, solenoid, electrically operating valve or any other suitable means can be substituted for the valve 86 which provides for the flow into the outer shell 12.

In order to permit a flow of the eutectic gel 22 into the shell 12 to a suitable volume, the shell 12 can be weighed with a tare weight and then the additional eutectic gel weight calibrated and provided for to a suitable weight. The particular weight will then establish the amount of gel 22 that is in shell 12.

With a suitable amount of gel, which has been shown at level 90 in FIG. 7, the inner shell 14 is disposed downwardly as, shown in the direction of arrow 94. This serves to drive the gel 22 upwardly alongside the inner walls of the container to a level suitable for providing thermally controlled eutectic gel for container 10.

The respective ribs 26 through 34 for the inner shell 14 and the ribs 50 through 54 of the outer shell 12 serve to guide the two respective inner and outer shells in an indexed manner. They also serve to provide support and structural strength after the containers 10 have been made or formed. Further to this extent, the shoulders 40 as previously described allow for a stacking of the inner shell 14 in a suitable stack for handling as well as manufacturing movement.

Figure 2:
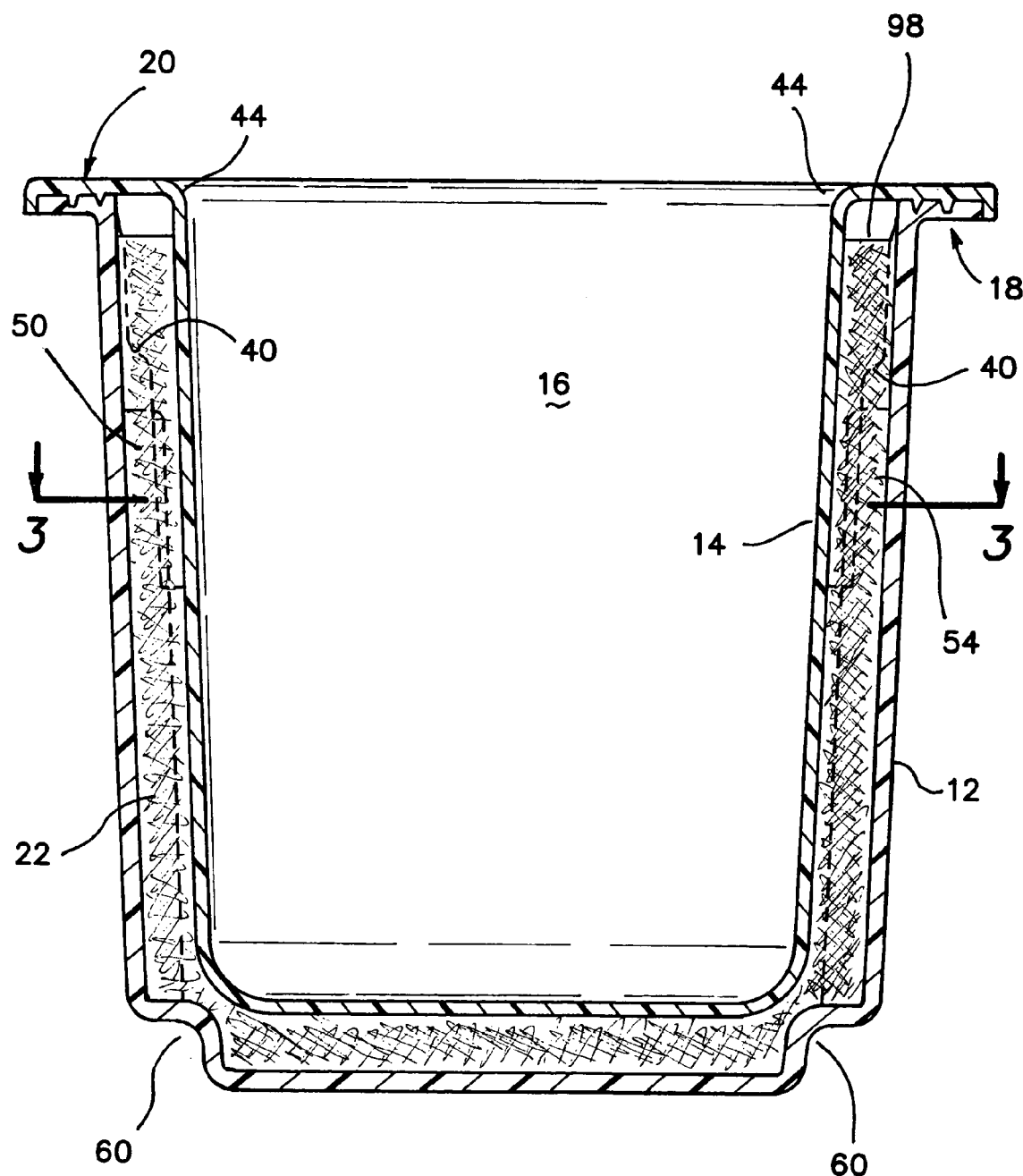
FIG. 2 shows a midline sectional view of the entire food container including the inner and outer shells when welded together and provided with eutectic gel between the walls thereof.
Figure 3:
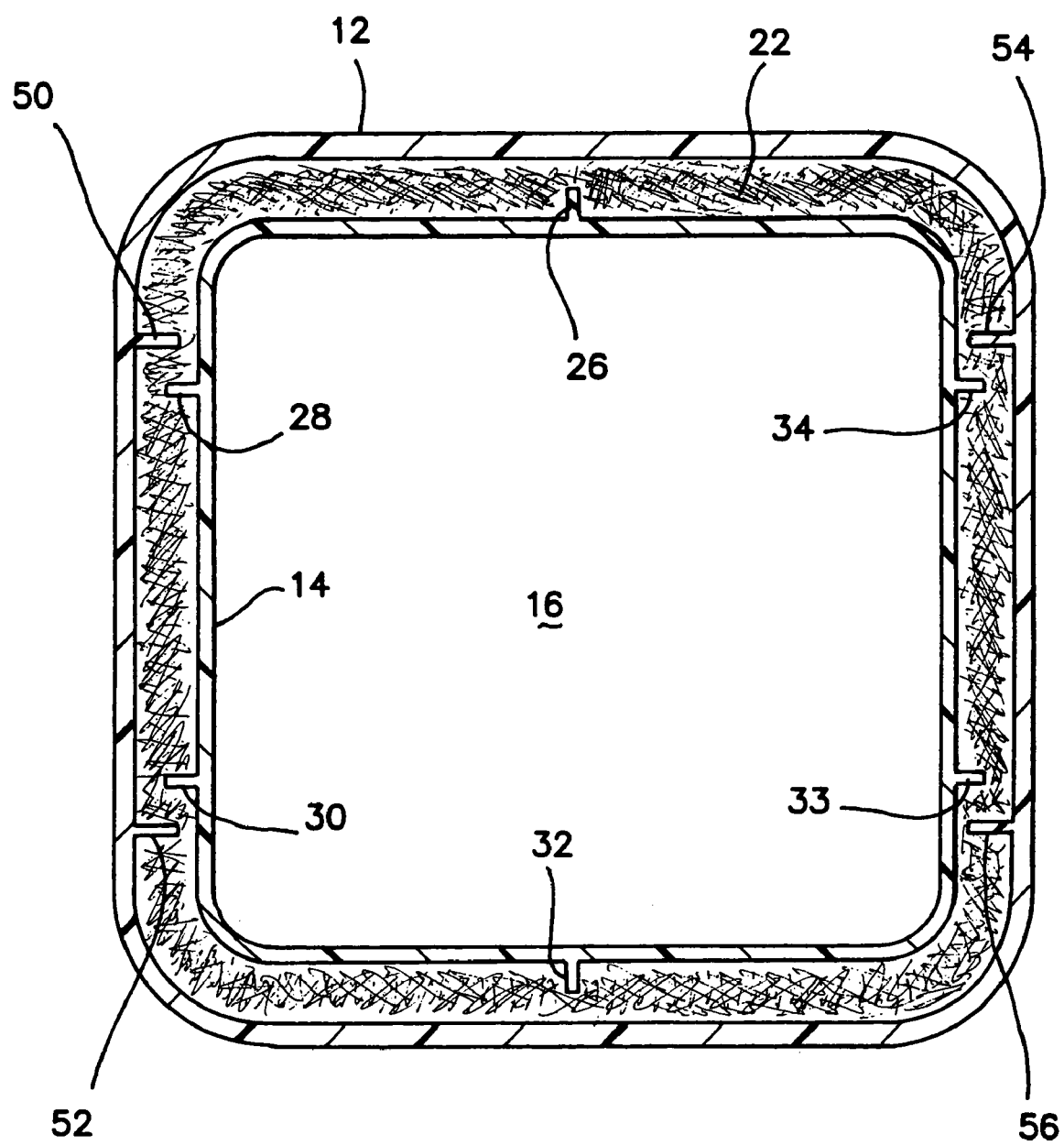
FIG. 3 shows a sectional view of the inner and outer shells as sectioned along lines 3—3 of FIG. 2.

When the inner shell 14 has been moved in the direction of arrow 94 into the outer shell 12, it thereby displaces the eutectic gel 22. The gel is driven to a suitable level such as level 98 shown in the FIG. 8 sectional view and the FIG. 2 sectional view of completed container 10.

After the inner shell 14 and outer shell 12 are held together as shown in FIG. 8, a welding horn 100 having a drive forcer 102 moves in the direction of arrow 104 for ultrasonically welding the respective shells 12 and 14. This is accomplished by a horn head 108 that is driven under the force of pressure by the drive force 104 and ultrasonic welding imparting energy to the horn 108. Such ultrasonic welding processes are known in the art from the standpoint of maintaining and welding such items that can be formed of plastic and other materials.

The enhancement of the welding process is accomplished by providing multiple or singular, ribs, ridges, strips, lands or rims in the way of a peripheral convex protuberance shown in FIGS. 2, 4, 5, and 12. These ridges can be seen in FIG. 4 prior to the respective inner and outer shells being driven together. In this particular instance, a first interior ridge having a V-shaped cross-section, which circumscribes the periphery of the major flange or ledge 20 is shown. This ridge can be defined as V-shaped or other suitably shaped rib 114 that generally surrounds the major ledge 20. A smaller rib, protuberance or flange 116 is shown with a second smaller flange 118. Both of these flanges are of a V-shaped configuration and substantially surround the periphery of the major ledge or flange 20.

A second larger peripheral rib or protuberance 120 is shown. The rib or protuberance 120 has an angular portion as seen in FIG. 11 in the form of an angular wall 122 and a fundamentally vertical wall 124 or upright wall which extends and is relatively normal to the plane or region of the major flange or ledge 20.

The major welding ribs 114 and 120 are received into grooves, channels or peripheral depressions shown in the major flange 18 of the outer shell 12. In particular, a groove or channel 130 receives rib 114. A peripheral channel or groove 132 serves to receive rib or protuberance 120.

Figure 11:
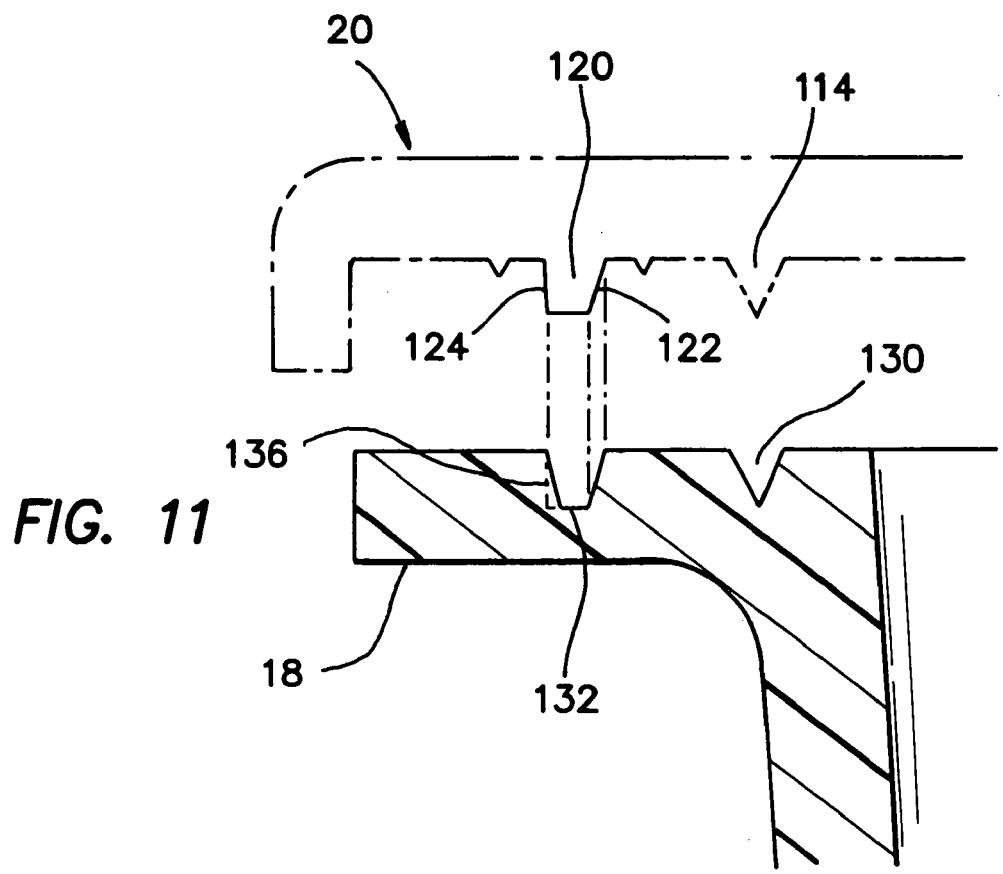
FIG. 11 shows a sectional view along lines 11—11, with a phantom view of a portion of the inner shell.
Figure 12:
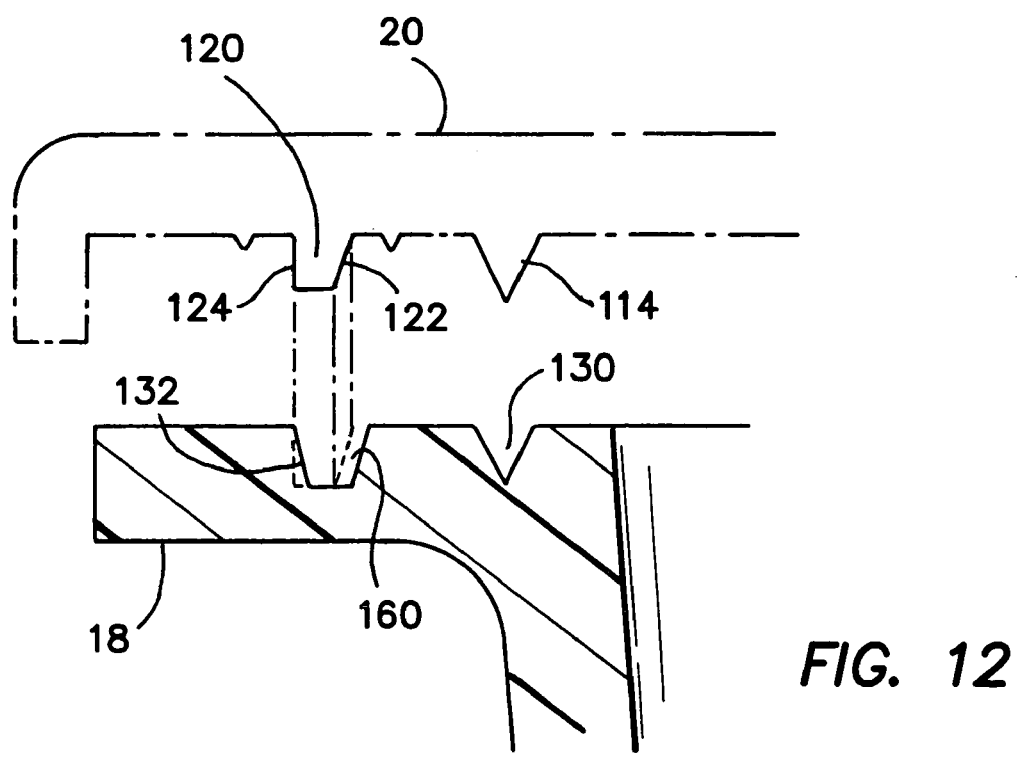
FIG. 12 shows a sectional view along lines 12—12, with a phantom view of a portion of the inner shell.

The respective rib 120 and groove 132 are formed so that when the rib 120 is driven into the groove 132, it tends to engage a sloping surface 136 as shown in FIG. 11 with the relatively normal or upright surface 124. The net result is to provide a frictional engagement that is driven together while at the same time the ultrasonic welding process takes place. This tends to displace the material of the sloping surface 136 and upright surface 124 while at the same time creating a tightened weld, which is secured in a tight, secured relationship.

Figure 4:
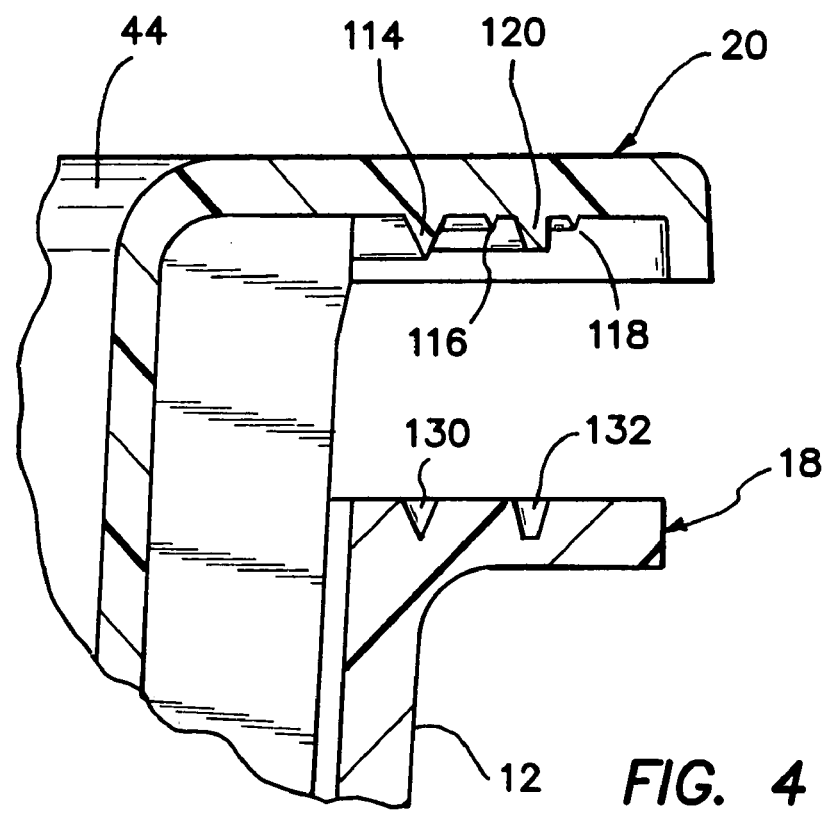
FIG. 4 is a view of the inner and outer shells of the container as sectioned through an edge region thereof in order to show the major flanges of the inner and outer shells with their respective rim, or ridges that seat in the channels of the outer shell.
Figure 5:
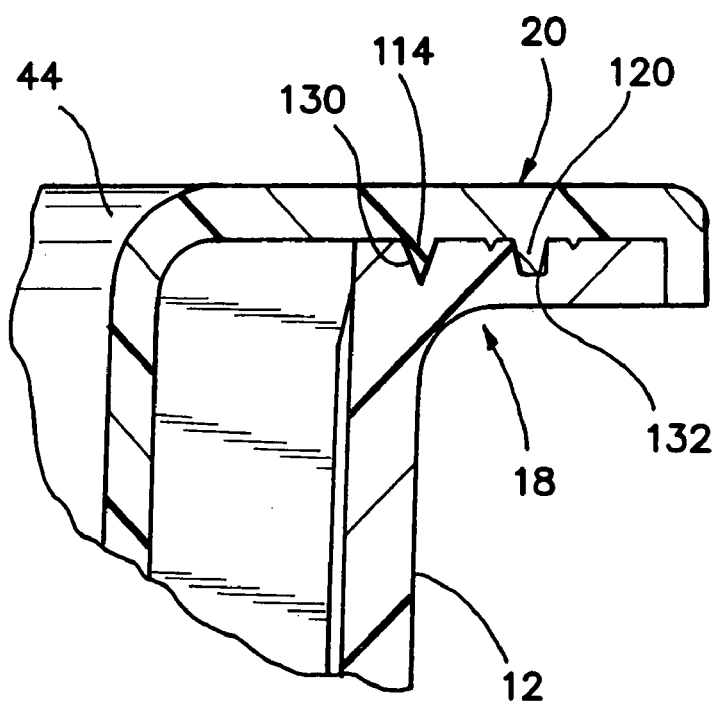
FIG. 5 is a sectional view through the flange area shown in FIG. 4 after weldment has taken place.
Figure 9:
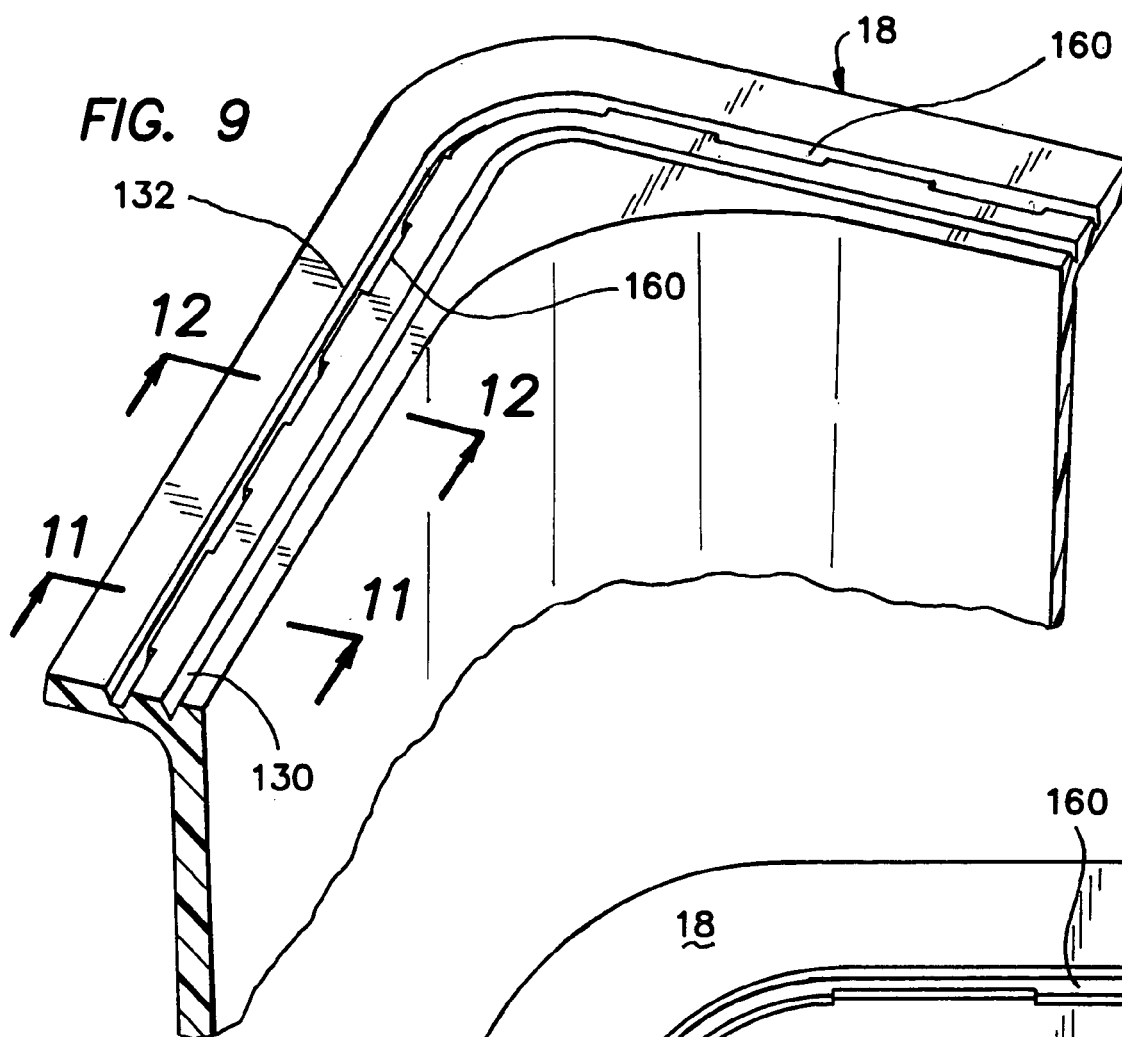
FIG. 9 shows a fragmented perspective view of the outer shell with the channels in the flange having the expansion gaps.
Figure 10:
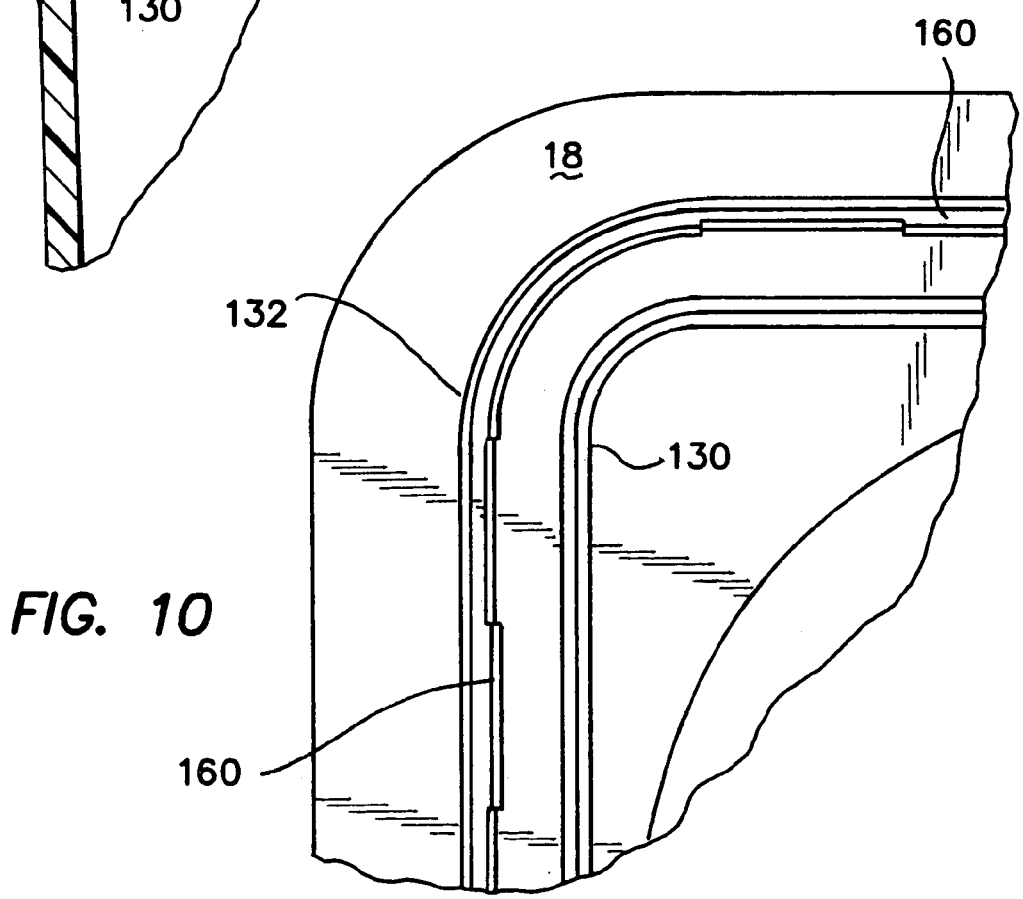
FIG. 10 shows a top plan view looking downwardly on the channels shown in FIG. 9 to exemplify the expansion gaps.

Looking more specifically at FIGS. 9, 10 and 11 in conjunction with FIGS. 4 and 5, it can be seen that the inner channel or groove 130 of the major flange 20 is shown as a relatively V-shaped cross-sectional configuration. However, the configuration can be of any suitable cross-section so long as it can receive the welding rib 114. Here again, the welding rib 114 can be of any suitable configuration as long as it can be matched generally to the groove or channel 130 or made to flow through sufficient ultrasonic bonding strength.

A special feature of this invention is the outer groove 132, which can also be emulated with the inner groove 130 having the same configuration. The outer groove 132 has a plurality of flow gaps, spaces, or expansion gaps 160. These gaps 160 permit an expansion of any gases or plastic material during the welding process. In effect, they allow for flow movement or gas displacement so that any gas or flow movement will not drive the peripheral rib 120 out of its bonded relationship through a fluidic or other material displacement of the materials comprising the rib or peripheral protuberance 122.

The number of gaps, spaces, offsets or displacement receipt areas 160 can be modified and changed depending upon the respective amount of displaced material during the welding process or plastic material as finalized. The movement of the material into the gaps 160 or offsets, permits a well-received joindure without a lessened displacement of the material of the rib or peripheral protuberance 120. In this manner, the respective major flanges 20 and 18 are joined together in a tightened manner. Further to this extent, the respective tightened manner of the grooves or channels 130 and 132 against their respective ribs or peripheral protuberances 114 and 120 is secured so that the major outer flange 20 overlaps and is relatively sealed to the inner shell 12. This can be more readily seen in FIG. 5.

Other suitable types of grooves, channels or other receipt peripheral features can be utilized depending upon the material to be welded and the respective flow characteristics produced by the ultrasonic welding process and the particular welding horn such as welding horn 100. Also, various displacement gaps 160 can be utilized such as those that would be of a curved, stepped, angular, depressed, or other suitable configuration. The cross-section of the respective gaps 160 can be displaced downwardly into the groove to a further extent, laterally as shown in the figures, or in a stepped configuration such that the cross-section when matched with the peripheral ribs 114 and 120 maintain a suitable connection therebetween while, at the same time, allowing displacement of fluidic plastic or other materials during the formation process.

Once the respective inner shell 14 is joined to the outer shell 12, with the eutectic gel therein, it can then be used. Usage is such where the entire container 10 is generally utilized to maintain cold temperatures of food. However, container 10 can be utilized for various functions including the maintenance of heat of food maintained therein. This would generally be accomplished by heating the eutectic gel or other interior material to a certain temperature for maintenance of that temperature. In such cases, the shells 12 or 14 must be formed to allow sufficient expansion and contraction to prevent breakage. A flexible inner and or outer shell 14 and 12 can provide expansion by flexible walls or sufficient space to allow such expansion.

In order to maintain foods at a lower temperature, the container 10 is placed with the opening 16 downwardly into a freezer or other cooling medium with a temperature of 0° Fahrenheit to 20° Fahrenheit (minus 18° C. to minus 28° C.) for a significant period of time. It has been found that an 8 hour freezing process helps to maintain improved cold retention.

Container 10 is then removed and food products are added thereto at a lowered temperature. The container 10 can be utilized to maintain food temperatures at a reduced temperature for an extended period of time when used in normal ambient conditions.

Further to this extent, the food containers can be held by the outer shell 12 peripheral flange 18 in a rack, web, or other suitable support on the peripheral flange 18 so as to support it for food service for an extended period of time. To this extent, the containers can also be stacked together by the utilization of the step, indention or respective inner peripheral ledge 60 surrounding the base thereof for purposes of stacking one container 10 on top of the other.

The invention claimed is:

1. A temperature controlled food container comprising:
   an inner portion having sidewalls and an opening for the receipt of food;
   an outer portion having sidewalls spaced from said inner portion;
   ribs along the sidewalls of said inner and outer portions, which extend sufficiently to provide displacement between said inner and outer portions;
   a eutectic gel, disposed between said inner and outer portions;
   a ledge extending from the periphery of said outer portion;
   a flange extending from the periphery of said inner portion adapted for seating against said ledge; and,
   an ultrasonic bond joining said ledge to said flange of said inner portion.

2. The food container as claimed in claim 1 further comprising:
   channels and ridges formed on said ledge or said flange for respective engagement with each other.

3. The food container as claimed in claim 2 further comprising:
   said channels are formed on said ledge for receipt of said ridges formed on said flange.

4. The food container as claimed in claim 2 further comprising:
   said channels are formed with enlarged segments, which extend beyond the cross-sectional dimension of a respective peripheral rib received therein.

5. The food container as claimed in claim 1 further comprising:
   an indentation forming a step at the base of the outer portion which can be seated at least partially into the inner portion opening.

6. A food container comprising:
   an outer shell portion having a ledge extending from a wall of said shell;
   an inner shell portion having a flange extending from a wall of said shell;
   a eutectic gel disposed between said shell portions; said ledge and flange adapted to be seated against each other;
   a channel or a protuberance respectively formed on said ledge or said flange for receipt and engagement of said flange by said channel; and,
   an ultrasonic bond formed between said flange and said ledge wherein said ultrasonic bond is formed at least in part between said channel and said protuberance.

7. The food container as claimed in claim 6 further comprising:
   said channel has enlarged portions, which are larger in cross-section than said protuberances to provide for expansion during an ultrasonic bond.

8. The food container as claimed in claim 6 further comprising:
   said outer shell portion has a step on the base thereof for resting at least partially within said inner shell portion.

9. The food container as claimed in claim 6 further comprising:
   said channel is formed on said ledge; and,
   said protuberance is formed on said flange.

10. The food container as claimed in claim 9 further comprising:
    said channel is one of a plurality formed on said ledge; and,
    said protuberance is one of a plurality formed on said flange.

11. A food container for providing temperature variances from the ambient comprising:
    a plastic outer shell having a peripheral ledge;
    a plastic inner shell formed with a peripheral flange;
    a peripheral channel or a peripheral protuberance formed on said ledge or said flange for respective engagement with each other;
    a eutectic gel disposed between said shells; and,
    an ultrasonic bond formed between said ledge and said flange wherein said channels and said peripheral protuberances are indexed into each other and welded substantially to each other.

12. The food container as claimed in claim 11 further comprising:
    said outer shell formed with a step for nesting at least partially into said inner shell.

* * * * *